(12) United States Patent
Sreerama et al.

(10) Patent No.: US 8,483,621 B2
(45) Date of Patent: Jul. 9, 2013

(54) RADIO FREQUENCY INTERFERENCE SENSING SYSTEM AND METHOD

(75) Inventors: Chaitanya Sreerama, Hillsboro, OR (US); Keith R. Tinsley, Beaverton, OR (US); Srikathyayani Srikanteswara, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1081 days.

(21) Appl. No.: 12/166,168

(22) Filed: Jul. 1, 2008

(65) Prior Publication Data

US 2010/0003924 A1    Jan. 7, 2010

(51) Int. Cl.
*H04B 15/00* (2006.01)
*H04B 17/00* (2006.01)

(52) U.S. Cl.
USPC ........................................ 455/67.13; 455/296

(58) Field of Classification Search
USPC ............... 455/63.1, 67.11, 67.13, 522, 226.1, 455/296
See application file for complete search history.

(56) References Cited

U.S. PATENT DOCUMENTS

| | | | |
|---|---|---|---|
| 5,048,015 A * | 9/1991 | Zilberfarb | 370/312 |
| 6,332,076 B1 * | 12/2001 | Shah et al. | 455/423 |
| 7,010,069 B2 * | 3/2006 | Chugg et al. | 375/346 |
| 2006/0079183 A1 * | 4/2006 | Song et al. | 455/63.1 |
| 2008/0160916 A1 * | 7/2008 | Jagger et al. | 455/63.1 |
| 2009/0197631 A1 * | 8/2009 | Palanki et al. | 455/522 |

* cited by examiner

*Primary Examiner* — Blane J Jackson
(74) *Attorney, Agent, or Firm* — Sutherland Asbill & Brennan LLP

(57) ABSTRACT

A method of sensing radio frequency interference (RFI) in a wireless system is provided. The method includes receiving wireless data through a wireless receiver and evaluating received wireless data through a receiver baseband module to identify an occurrence of a signal detection failure by a physical (PHY) layer or a media access control (MAC) layer of the wireless system. The method also includes triggering a radio frequency interference sensing state in response to the occurrence of signal detection failure by the physical layer or the media access control layer of the wireless system.

18 Claims, 4 Drawing Sheets

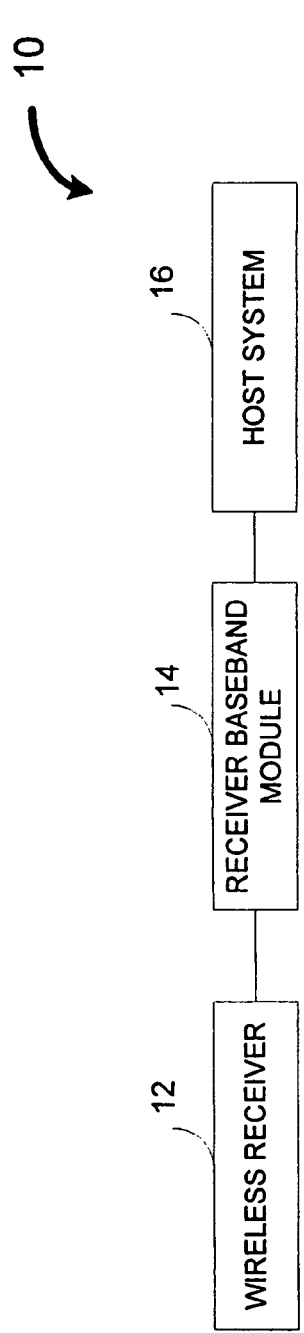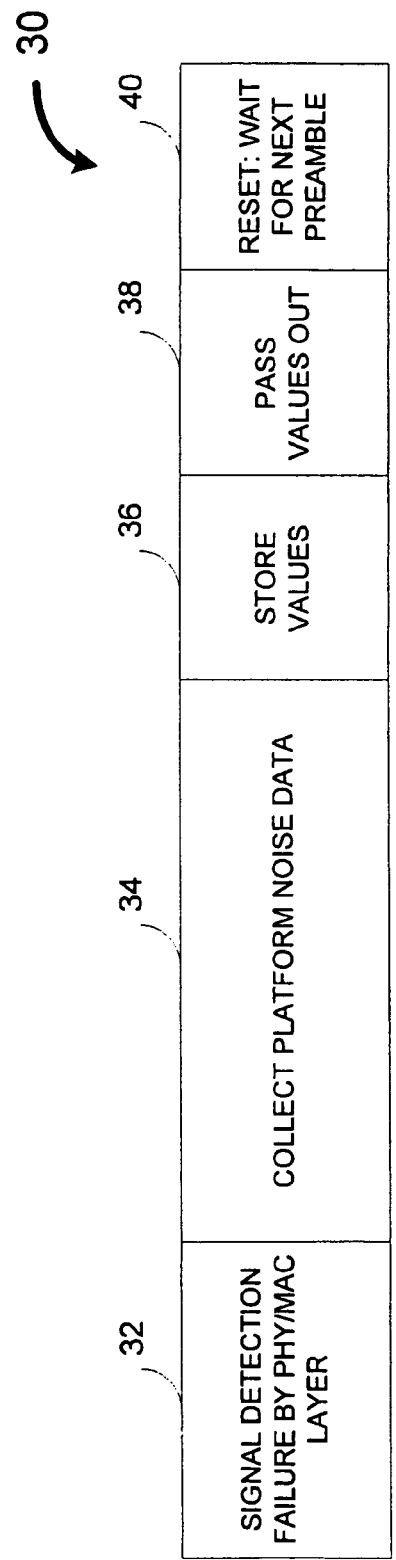
FIG. 1
FIG. 2

RADIO FREQUENCY INTERFERENCE SENSING SYSTEM AND METHOD

BACKGROUND

Platform noise or radio frequency interference (RFI) in wireless systems is a phenomenon that degrades the performance (throughput) of the wireless systems through decreases in radio sensitivity. Typically, radio frequency interference in wireless systems is due to internal electromagnetic emissions from devices such as computing clocks, PCI express (PCIe) clocks, processors etc of such systems. Examples of such emissions include narrowband (NB) emissions, wideband (WB) emissions and broadband RFI emissions. Such emissions are undesirable and result in reduced platform wireless range of the system.

Current wireless systems do not have mechanisms to deal with performance impacts associated with the radio frequency interference. Typically, a wireless system responds to the radio frequency interference by terminating the wireless receiver operation and resetting the system for acquisition of next preamble. However, this leads to a dead period that degrades the communication and computing functionality of the system.

BRIEF DESCRIPTION OF THE DRAWINGS

Features of embodiments of the claimed subject matter will become apparent as the following detailed description proceeds, and upon reference to the drawings, in which like numerals depict like parts, and in which:

FIG. 1 illustrates an embodiment of a wireless system;

FIG. 2 is a block diagram illustrating operation of a physical layer of the wireless system of FIG. 1;

Figure 3:
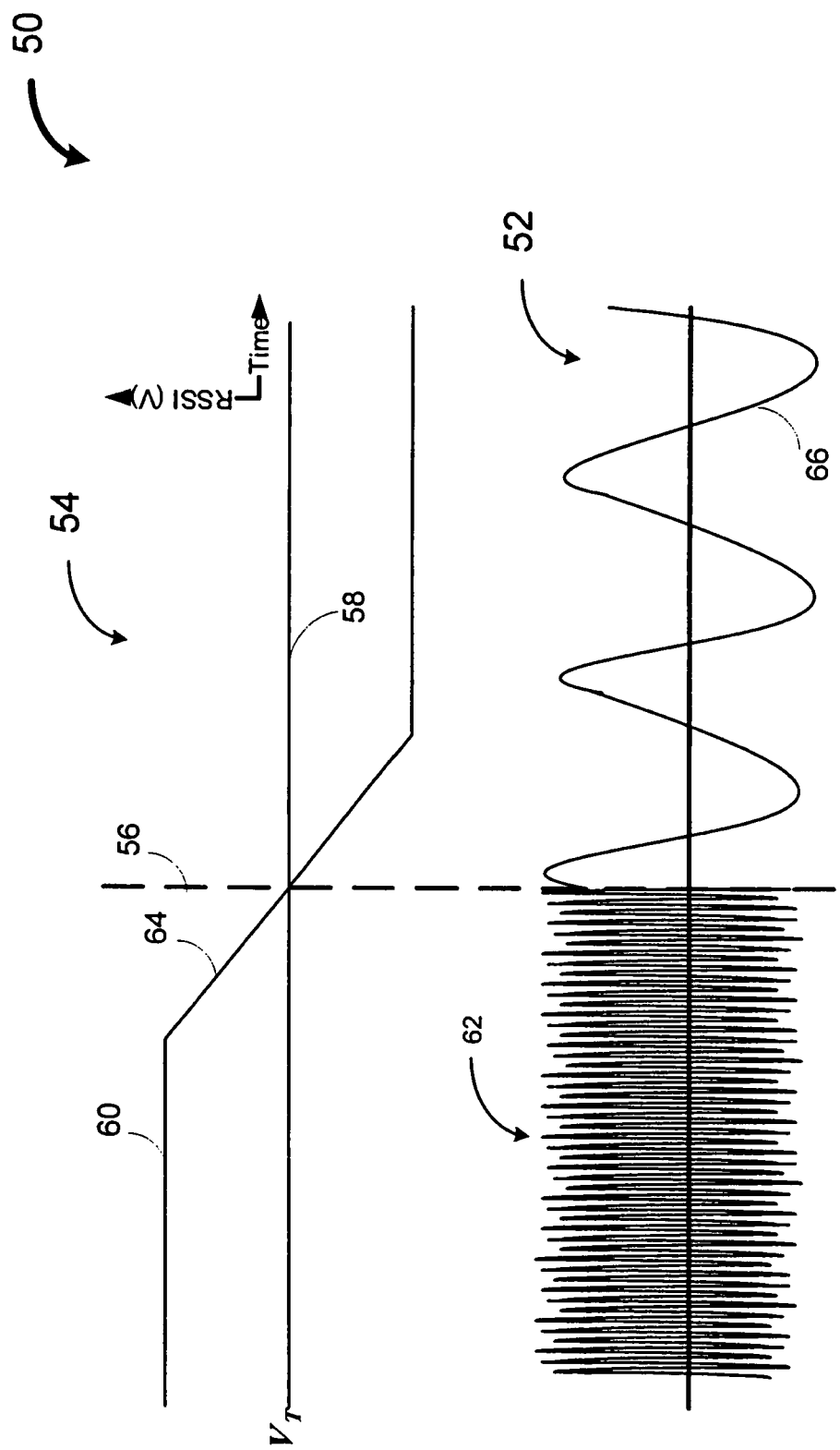
FIG. 3 is a graphical representation of exemplary profiles of received signal strength indicator (RSSI) and wireless data received by the wireless system of FIG. 1.

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

As discussed in detail below, the embodiments of the present invention function to provide a method of radio frequency interference (RFI) sensing for wireless systems. In particular, the present technique provides a method of radio frequency interference sensing based upon physical (PHY) and media access control (MAC) layer events of a wireless system.

References in the specification to "one embodiment", "an embodiment", "an exemplary embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device).

For example, a machine-readable medium may include read only memory (ROM); random access memory (RAM); magnetic disk storage media; optical storage media; flash memory devices. Further, firmware, software, routines, and instructions may be described herein as performing certain actions. However, it should be appreciated that such descriptions are merely for convenience and that such actions in fact result from computing devices, processors, controllers, and other devices executing the firmware, software, routines, and instructions.

Referring first to FIG. 1, a wireless system 10 is illustrated. The wireless system 10 includes a wireless receiver 12 to receive wireless data. Further, the wireless system 10 includes a receiver baseband module 14 to evaluate received wireless data and to trigger a radio frequency interference sensing state based upon an occurrence of a signal detection failure by a physical (PHY) layer (not shown) or a media access control (MAC) layer (not shown) of the wireless system 10. In particular, the receiver baseband module 14 collects and stores samples of wireless data in the radio frequency interference state. Further, a host system 16 receives the stored data to identify and distinguish the radio frequency interference from the received wireless data.

In operation, the wireless system 10 receives the wireless data through the wireless receiver 12. In this embodiment, the wireless receiver 12 includes an analog front end (not shown) and an analog to digital converter (not shown). The received wireless data is then evaluated by the receiver baseband module 14 to detect an occurrence of a signal detection failure or a false alarm by the physical or media access control layer of the wireless system 10. Once a signal detection failure is detected, the receiver baseband module 14 triggers the radio frequency interference (RFI) sensing state.

In one exemplary embodiment, the receiver baseband module 14 triggers the radio frequency interference sensing state based upon a received signal strength indicator (RSSI) of the received wireless data. In this embodiment, the radio frequency interference sensing state is triggered by a high to low transition of the received signal strength indicator (RSSI) of the received wireless data. In certain embodiments, the radio frequency interference sensing state is triggered when the received signal strength indicator (RSSI) of the received wireless data is less than a predetermined threshold.

In an alternate embodiment, the receiver baseband module 14 triggers the radio frequency interference sensing state based upon identification of an incorrect preamble of wireless data by the physical layer of the wireless system 10. Further, the receiver baseband module 14 collects and stores wireless data for a pre-determined duration of time in the radio frequency interference sensing state. In one exemplary embodiment, the predetermined duration is about 100 microseconds. In certain embodiments, the receiver baseband module 14 collects the wireless data during a plurality of sensing windows in the radio frequency interference sensing state. The stored data is subsequently transmitted to the host system 16 for radio frequency interference identification.

In certain embodiments, a closed loop control is employed to minimize the impact of the detected radio frequency interference on the wireless system 10. For example, a radio frequency interference source (not shown) may be configured to minimize the radio frequency interference impact on the wireless system 10. As will be appreciated by one skilled in the art the radio frequency interference detection enables radio frequency interference mitigation through spectral smoothing or by adjustment of maximum likelihood detection parameters.

FIG. 2 is a block diagram illustrating operation of a physical layer 30 of the wireless system 10 of FIG. 1. As illustrated, a signal detection failure by the physical layer or the media access control layer is detected based upon a false alarm or based upon the received signal strength indicator (RSSI) of the received wireless data (block 32). In one exemplary embodiment, the false alarm is based upon identification of an incorrect preamble of the wireless data. At block 34, samples of platform noise data are collected through the receiver baseband module 12 (see FIG. 1).

In this exemplary embodiment, the data is collected during a sensing window having a pre-determined duration. In certain embodiments, the data is collected during a plurality of sensing windows having pre-determined duration. Further, the collected data is stored, as represented by block 36. In this embodiment, the stored data is transmitted to the host system 16 (see FIG. 1) to identify and distinguish the radio frequency interference from the wireless data (block 38). At block 40, the physical layer is reset to receive next preamble of wireless data. Once the received data passes the physical preamble test by the physical layer, the wireless system 10 resumes the nominal payload and cyclic redundancy check (CRC) operations.

FIG. 3 is a graphical representation of exemplary profiles 50 of received signal strength indicator (RSSI) and wireless data received by the wireless system of FIG. 1. In the illustrated embodiment, wireless signals received by the wireless receiver 12 (see FIG. 1) are represented by exemplary profile 52. Further, the received signal strength indicator profile corresponding to the wireless signals 52 is represented by reference numeral 54. In the illustrated embodiment, the ordinate axis 56 represents the received signal strength indicator measured in volts and the abscissa axis 58 represents time measured in seconds. In this exemplary embodiment, the received signal strength indicator is a constant value for a period of time as represented by reference numeral 60. The received signal strength indicator 60 corresponds to wireless signals 62 of received data. In certain embodiments, the signals 62 may include some radio frequency interference or other undesirable noise.

Further, there is a reduction in the received signal strength indicator as represented by reference numeral 64. The reduced received signal strength indicator 64 corresponds to radio frequency interference 66 in the wireless system 10. As described before, such reduction in the received signal strength indicator triggers the radio frequency interference sensing state for collecting sample wireless data for radio frequency interference detection and identification. The sample wireless data includes ADC samples collected for a pre-determined duration which are subsequently passed to the host system 16 (see FIG. 1) for radio frequency interference identification.

Moreover, such collected data may be used to enhance the range and throughput of the wireless system 10 by adaptive decision detectors through parameter processing of the collected radio frequency interference data. In certain embodiments, the radio frequency interference source may be configured for minimizing the radio frequency interference in the wireless system 10.

Figure 4:
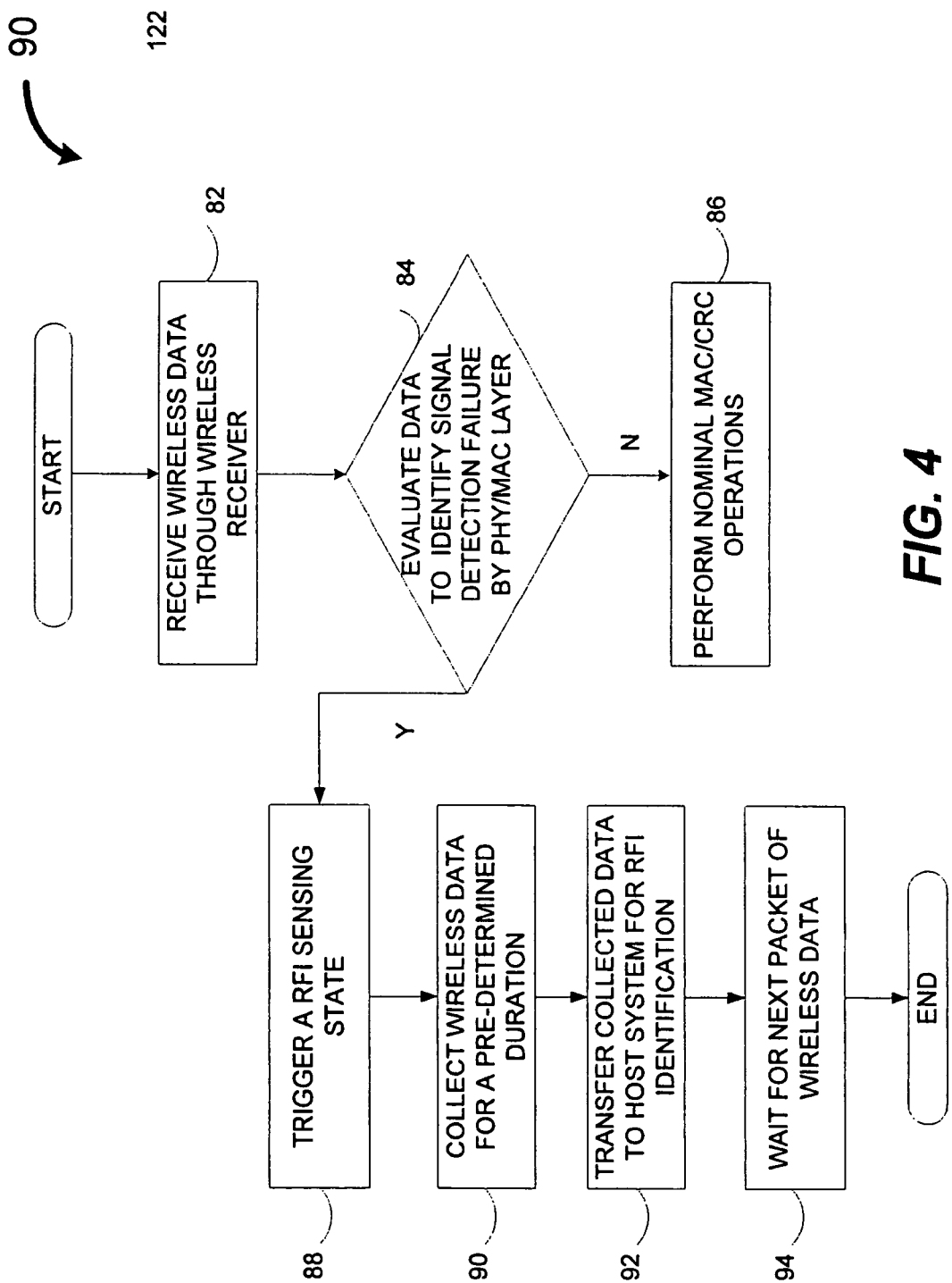
FIG. 4 illustrates an exemplary process for method of sensing radio frequency interference in the wireless system of FIG. 1.

FIG. 4 illustrates an exemplary process 80 for method of sensing radio frequency interference in the wireless system 10 of FIG. 1. At block 82, wireless data is received through a wireless receiver of the wireless system. At block 84, the received data is evaluated through a receiver baseband module to identify an occurrence of signal detection failure by the physical layer or the MAC layer of the wireless system. In one embodiment, a physical preamble test is performed to detect a false alarm that is representative of the signal detection failure. In another embodiment, a reduction in the received signal strength indicator of the received data is representative of the signal detection failure.

If an occurrence of signal detection failure is not identified, then the wireless system proceeds with nominal media access control and cyclic redundancy check operations (block 86). Further, if an occurrence of signal detection failure is identified, a radio frequency interference sensing state is triggered, as represented by block 88. At block 90, wireless data is collected for a pre-determined duration through the receiver baseband module. In certain embodiments, the wireless data is collected during a plurality of sensing windows in the radio frequency interference sensing state. Further, the collected data is stored in the receiver baseband module.

At block 92, the stored data is transferred to a host system for radio frequency identification. In certain embodiments, the stored data is analyzed to identify the impact of the radio frequency interference on the wireless system. Furthermore, a radio frequency interference source may be configured to minimize the impact of the radio frequency interference on the wireless system. At block 94, the wireless system is ready to receive the next packet of wireless data and to perform the operations described above for radio frequency identification.

Figure 5:
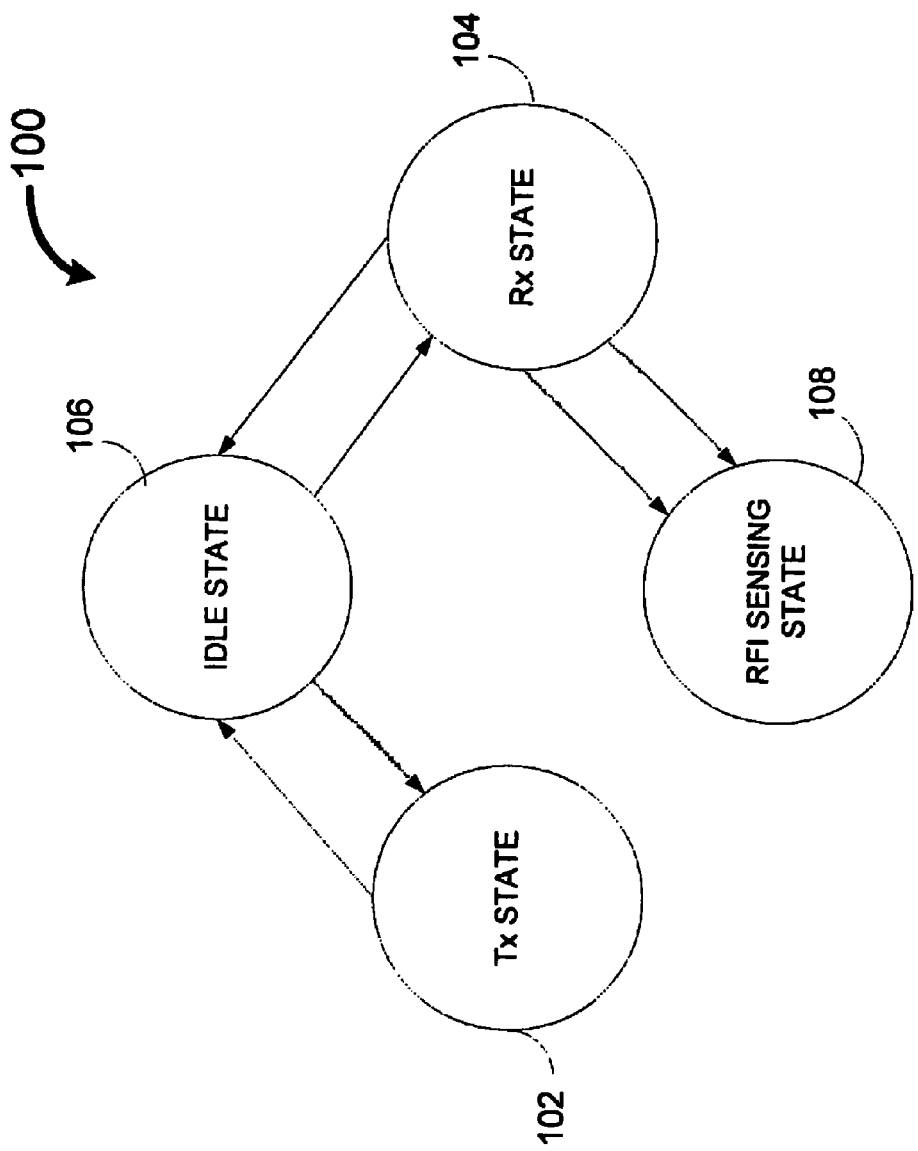
FIG. 5 illustrates an exemplary state diagram of the wireless system of FIG. 1.

FIG. 5 illustrates an exemplary state diagram 100 of the wireless system 10 of FIG. 1. As illustrated, the wireless system 10 operates in transmission ($T_x$) and receiving ($R_x$) states 102 and 104 where information is exchanged. Further, the wireless system 10 operates in an idle state 106 that includes channel setup events such as voltage controlled oscillator (VCO) setting time and resetting of PHY\MAC logic counters. In addition, the wireless system 10 operates in a radio frequency interference sensing state 108 which is a part of the lower media access control (MAC) layer. As described before, the radio frequency interference state is activated by events associated with false alarm and received signal strength indicator (RSSI) transition.

Once sensing is initiated, certain inputs may be provided to the wireless system 10 that determine the duration and type of radio frequency interference sensing using time-sliced data. Examples of such inputs include, but are not limited to, duration of a single sensing window, quiet time where no data is collected and number of sensing windows.

In one exemplary embodiment, the duration of a single sensing window is about 100 microseconds. In another exemplary embodiment, the quiet time where no data is collected is about 400 microseconds. The time slicing described above allows for periodic capture of sensing data instead of continuous sensing which reduces the buffering requirements as well as the computational complexity of the detection algorithm. As will be appreciated by one skilled in the art programmable sensing windows enable the system to collect only as much data as needed and tailor the data collection to the possible interferes in the environment.

Some embodiments of the invention may be implemented by software, by hardware, or by any combination of software and/or hardware as may be suitable for specific applications or in accordance with specific design requirements. Some embodiments of the invention may include buffers, registers, stacks, storage units and/or memory units, for temporary or long-term storage of data in order to facilitate the operation of a specific embodiment.

The foregoing detailed description and accompanying drawings are only illustrative and not restrictive. They have been provided primarily for a clear and comprehensive understanding of the disclosed embodiments and no unnecessary limitations are to be understood therefrom. Numerous additions, deletions, and modifications to the embodiments described herein, as well as alternative arrangements, may be devised by those skilled in the art without departing from the spirit of the disclosed embodiments and the scope of the appended claims.

The invention claimed is:

1. A method of sensing radio frequency interference (RFI) in a wireless system, comprising:
   receiving wireless data through a wireless receiver;
   evaluating received wireless data through a receiver baseband module to identify an occurrence of a signal detection failure by a physical (PHY) layer or a media access control (MAC) layer of the wireless system;
   triggering a radio frequency interference sensing state in response to the occurrence of signal detection failure by the physical layer or the media access control layer of the wireless system;
   collecting wireless data for a pre-determined duration in the radio frequency interference sensing state through the receiver baseband module;
   storing the collected wireless data in the receiver baseband module; and
   transferring the stored wireless data from the receiver baseband module to a host system, the host system to receive the stored wireless data in the radio frequency interference sensing state to identify and distinguish the radio frequency interference from the received wireless data.

2. The method of claim 1, comprising identifying the signal detection failure of the physical layer or the media access control layer signal based upon an incorrect preamble of the received wireless data.

3. The method of claim 1, further comprising triggering the RFI sensing state based upon a received signal strength indicator (RSSI) of the received wireless data.

4. The method of claim 1, wherein the pre-determined duration is about 100 microseconds.

5. The method of claim 1, further comprising collecting the wireless data during a plurality of sensing windows in the radio frequency interference sensing state.

6. The method of claim 1, further comprising:
   analyzing the stored wireless data to identify impact of the radio frequency interference on the wireless system; and
   configuring a radio frequency interference source to minimize the impact of the radio frequency interference on the wireless system.

7. A wireless system, comprising:
   a wireless receiver to receive wireless data;
   a receiver baseband module to evaluate received wireless data and to trigger a radio frequency interference sensing state based upon an occurrence of a signal detection failure by a physical (PHY) or a media access control (MAC) layer of the wireless system, wherein the reciever baseband is further configured to collect and store wireless data; and
   a host system to receive the stored wireless data in the radio frequency interference sensing state to identify and distinguish the radio frequency interference from the received wireless data.

8. The wireless system of claim 7, wherein the receiver baseband module is to trigger the radio frequency interference sensing state based upon a received signal strength indicator (RSSI) of the received wireless data.

9. The wireless system of claim 7, wherein the receiver baseband module is to trigger the radio frequency interference sensing state based upon identification of an incorrect preamble of the wireless data.

10. The wireless system of claim 9, wherein the receiver baseband module is to collect the wireless data during a plurality of sensing windows in the radio frequency interference sensing state.

11. The wireless system of claim 7, wherein the receiver baseband module is to collect and store wireless data for a pre-determined duration of time in the radio frequency interference sensing state.

12. The method of claim 11, wherein the pre-determined duration is about 100 microseconds.

13. A method of operating a wireless system, comprising:
   receiving wireless data through a wireless receiver;
   evaluating received wireless data through a receiver baseband module to identify an occurrence of a signal detection failure by a physical (PHY) layer or a media access control (MAC) layer of the wireless system; and
   collecting wireless data for a pre-determined duration through the receiver baseband module in response to the occurrence of the signal detection failure by the physical layer or the media access control layer; and
   transferring the collected wireless data to a host system for radio frequency interference sensing.

14. The method of claim 13, further comprising configuring a radio frequency interference source to minimize the radio frequency interference in the wireless system.

15. The method of claim 13, further comprising subsequently resuming nominal media access control and cyclic redundancy check operations of the wireless system.

16. The method of claim 13, further comprising collecting the wireless data during a plurality of programmable sensing windows.

17. The method of claim 13, further comprising identifying the occurrence of the signal detection failure by comparing a measured received signal strength indicator (RSSI) of the received wireless data with a threshold.

18. The method of claim 17, wherein the threshold is about -100dBm for a WiFi radio.

* * * * *

UNITED STATES PATENT AND TRADEMARK OFFICE
CERTIFICATE OF CORRECTION

PATENT NO. : 8,483,621 B2  
APPLICATION NO. : 12/166168  
DATED : July 9, 2013  
INVENTOR(S) : Chaitanya Sreerama et al.

Page 1 of 1

It is certified that error appears in the above-identified patent and that said Letters Patent is hereby corrected as shown below:

In the Claims:

In column 6, line 29, in claim 12, delete "method" and insert -- system --, therefor.

Signed and Sealed this  
First Day of October, 2013

Teresa Stanek Rea  
*Deputy Director of the United States Patent and Trademark Office*